United States Patent [19]
Terry, Jr. et al.

[11] Patent Number: 4,745,315
[45] Date of Patent: May 17, 1988

[54] BRUSHLESS EXCITER WITH ZERO-GRAVITY RECTIFIER ASSEMBLY

[75] Inventors: Vincent G. Terry, Jr., Beverly; Robert G. Hamilton, Georgetown, both of Mass.

[73] Assignee: General Electric Company, Schenectady, N.Y.

[21] Appl. No.: 561,689

[22] Filed: Dec. 15, 1983

[51] Int. Cl.⁴ ............................................. H02K 9/00
[52] U.S. Cl. ................... 310/68 D; 310/61; 357/76; 363/145
[58] Field of Search ............. 310/58, 61, 68 R, 68 D; 357/76, 79, 81; 363/141, 145

[56] References Cited

U.S. PATENT DOCUMENTS

| | | | |
|---|---|---|---|
| 1,996,460 | 4/1935 | Coates | 310/61 |
| 2,414,287 | 1/1947 | Crever | 310/68 D |
| 2,773,203 | 12/1956 | Opel et al. | 310/61 |
| 2,897,383 | 7/1959 | Barrows et al. | 310/68 R |
| 3,348,127 | 10/1967 | Petersen | 322/59 |
| 3,381,209 | 4/1968 | Richardson et al. | 322/59 |
| 3,412,271 | 11/1968 | Hall | 310/68 R |
| 3,501,659 | 3/1970 | Pannell | 310/68 R |
| 3,577,002 | 5/1971 | Hall et al. | 310/68 D |
| 3,727,114 | 4/1973 | Oshima | 357/76 |

FOREIGN PATENT DOCUMENTS

| | | | |
|---|---|---|---|
| 116638 | 9/1979 | Japan | 357/76 |
| 123154 | 9/1980 | Japan | 357/76 |
| 1121395 | 7/1968 | United Kingdom | 357/76 |

Primary Examiner—Patrick R. Salce
Assistant Examiner—D. L. Rebsch
Attorney, Agent, or Firm—Jerome C. Squillaro

[57] ABSTRACT

A brushless exciter for a dynamoelectric machine includes a rectifier assembly disposed in a cylindrical cavity on an axis of the shaft of the dynamoelectric machine. The rectifier assembly is made up of a stack of generally circular heat-sink discs with a cylindrical diode sandwiched on the axis between adjacent pairs of the heat-sink discs. A predetermined value of contact force is applied to the diodes through the stack of heat-sink discs using a plurality of tensioning bolts passing through the stack and tensioned using Belleville springs. All electrical connections to the diodes are made through the heat-sink discs using conductor bars which pass in aligned slots in the edges of the heat-sink discs, each making contact with only a desired single one of the heat-sink discs. A plurality of air flow openings in the heat-sink discs both permit the passage of air therethrough and also flow cooling air onto the body of the diodes. The flow of cooling air is enhanced by providing exit openings for the cooling air which are located at greater diameters than the diameter of the cylindrical cavity containing the rectifier assembly. This permits centrifugal force to add to the air flow.

10 Claims, 5 Drawing Sheets

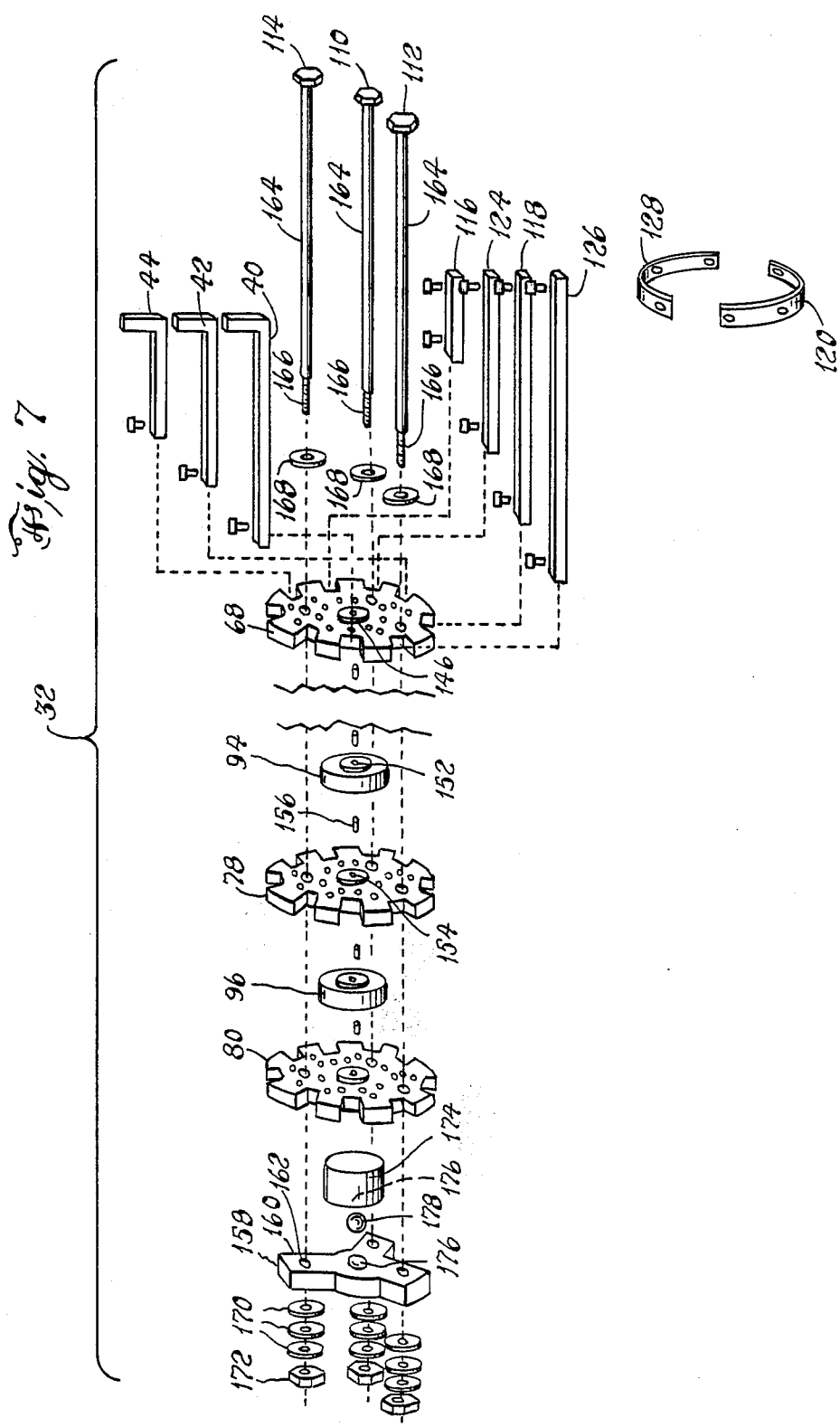

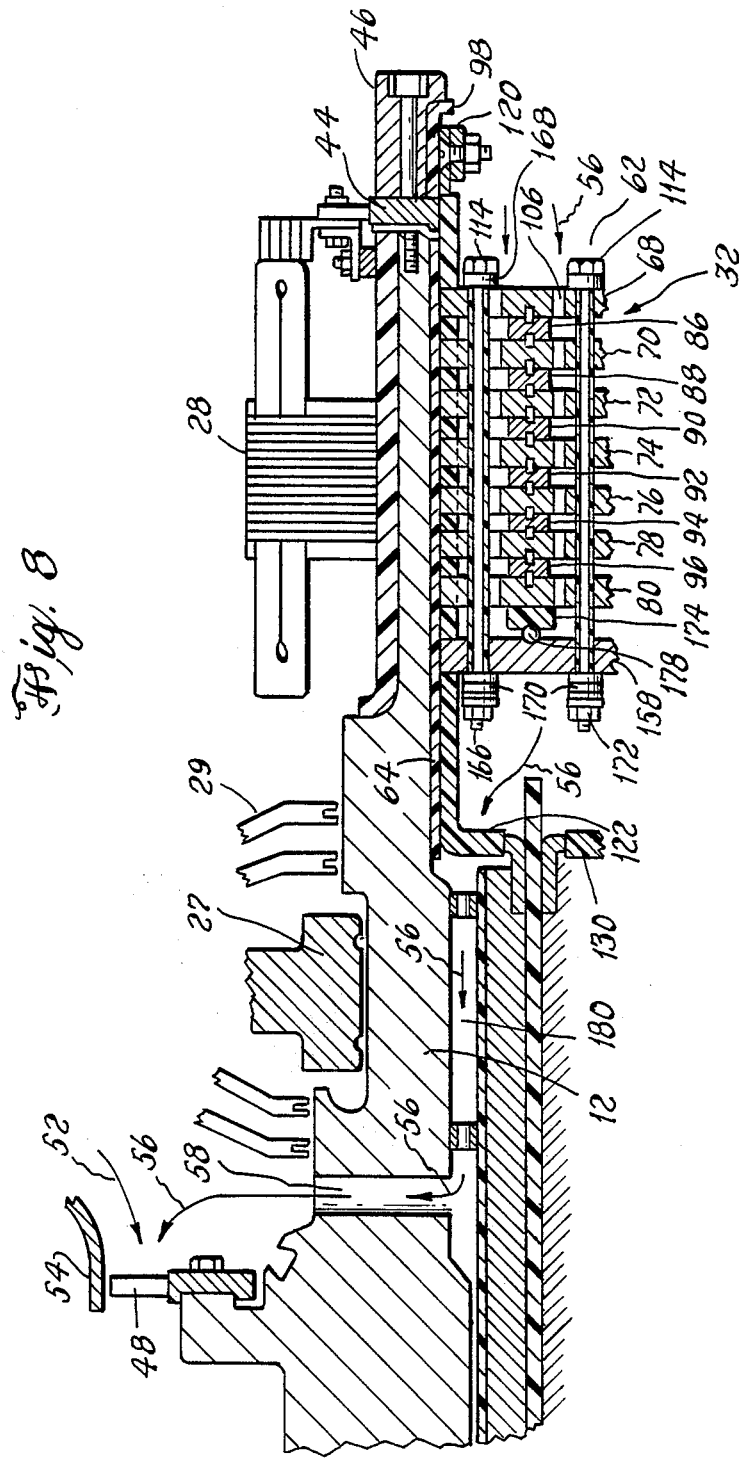

BRUSHLESS EXCITER WITH ZERO-GRAVITY RECTIFIER ASSEMBLY

BACKGROUND OF THE INVENTION

The present invention relates to dynamoelectric machines and, more particularly, to electric motors and generators of the type having a DC rotor field receiving DC excitation from an AC generator which has its rotor integrally rotating with the DC rotor field and a plurality of rectifiers, also rotating with the rotor field for converting the AC from the AC generator into DC for the DC rotor field. This type of exciter is generally referred to as a brushless exciter, since DC excitation is generated on the rotating elements without requiring brushes to transfer it from a non-rotating location.

In dynamoelectric machines operating at speeds of 3600 RPM or below, hereinafter referred to as low-speed machines, the necessary rectifiers, usually six in number, are mounted on a disc which rotates with the rotor shaft. It is customary to use pigtail-type rectifiers in this application. As the shaft speed is increased to, for example 6000 RPM, several undesirable effects interfere with the use of pigtail-type rectifiers on a shaft-mounted disc. The principal problem results from the fact that, at such high rotational speeds, the shaft overhang of such a disc carrying a load of pigtail-type diodes adds resonance problems to the critical speeds of the machine.

One attempt to solve this problem is disclosed in U.S. Pat. No. 2,897,383 to Barrows et al in which pigtail-type diodes are disposed on the axis of rotation within the shaft to reduce the centrifugal forces and to reduce the overhanging mass. This structure may be satisfactory for low-speed machines, but at higher speeds, the shaft diameters must be so greatly reduced to limit the centrifugal stress on the material of the shaft that insufficient space remains within a practical shaft diameter to allow installation of pigtail-type diodes. In addition, the presence of the pigtails and necessary wire connections thereto aggravates the problems of precise balancing.

A type of small, efficient, diode exists which does not employ pigtail connections and which is axially symmetric. This type of diode is sometimes referred to as a hockey-puck type diode. The hockey-puck diode, typified by diode type A390P, manufactured by the General Electric Company, as well as equivalent types manufactured, for example, by International Rectifier Corp., is essentially a small cylindrical casing containing a mass of silicon and having planar nickel-plated copper contact electrodes at the ends of the cylindrical casing. Conventional doping of the silicon establishes the diode characteristics. Electrical connection to a hockey-puck diode is made by metallic contacts forcibly urged along the axis of the diode against the two contact electrodes. For proper operation, a hockey-puck diode requires a relatively precise contact force. For example, one type of such diode requires a contact force of within about 10 percent of 800 pounds.

Due to the need for precise contact force, hockey-puck diodes cannot be used off the axis of rotating elements of high-speed machines. Centrifugal forces in such locations would cause variations in the contact force which exceeds the specifications for efficient operation of the diodes.

All diodes carrying substantial power and operating in enclosed spaces require cooling to limit their temperature rise to values which give reasonable lifetimes. Preferably, such cooling should be performed without adding substantially to the rotating load.

OBJECTS AND SUMMARY OF THE INVENTION

Accordingly, it is an object of the invention to provide a rectifier assembly for a brushless exciter which overcomes the drawbacks of the prior art.

It is a further object of the invention to provide a rectifier assembly for a brushless exciter employing a plurality of hockey-puck diodes on the axis of a rotating shaft with means for producing a precise predetermined contact force along the axis of the diodes.

It is a still further object of the invention to provide a rectifier assembly having an improved flow of cooling air.

According to an embodiment of the invention, there is provided a rectifier assembly for use in a brushless exciter of a dynamoelectric machine, the dynamoelectric machine including a cylindrical cavity in a shaft thereof and an exciter on the shaft effective for generating AC power, comprising a plurality of conductive heat-sink discs having their axes aligned to form a stack, a hockey-puck diode disposed in the stack between each adjacent pair of the heat-sink discs, an axis of each of the hockey-puck diodes being aligned with the axes of the heat-sink discs, each of the hockey-puck diodes including first and second contacts on the axis at each of first and second sides thereof respectively, means for applying an inward axial force on axially outward ones of the heat-sink discs whereby a predetermined axial contact force is provided between each of the first and second contacts and their adjacent pair of the heat-sink discs, the stack being fittable within the cylindrical cavity, means for connecting AC power to a first subset of the heat-sink discs, each of the heat-sink discs of the first subset including means for connecting the AC power to a selected one of the first and second contacts of a second subset of the hockey-puck diodes, means for connecting rectified DC power from a third subset of the heat-sink discs and the third subset including means for receiving the DC power from selected ones of the first and second contacts of a fourth subset of the hockey-puck diodes.

According to a feature of the invention, there is provided apparatus for cooling a rectifier assembly disposed in a cylindrical cavity on an axis of a shaft of a dynamoelectric machine, the rectifier assembly including a stack of generally circular heat-sink discs and a cylindrical diode axially disposed in the stack between each adjacent pair of heat-sink discs comprising a plurality of air flow openings in each of the heat-sink discs, means for admitting air to an outer end of the stack, means for conducting air axially from an inner end of the stack, at least one radially directed air flow channel from the means for conducting to a location external to the shaft and a radial distance from the axis to the location being greater than a diameter of the cylindrical cavity whereby centrifugal force urges an air flow through the stack.

According to a further feature of the invention, there is provided a rotating member for a dynamoelectric machine comprising a shaft, a rotor on the shaft, an extension on the shaft, an exciter rotor on the extension, the exciter rotor being effective with a remainder of the dynamoelectric machine to generate AC power, a cylindrical cavity axially disposed in the extension, a plurality of conductive heat-sink discs in the cavity, the heat-sink discs having their axes aligned to form a stack, a hockey-puck diode disposed in the stack between each adjacent pair of the heat-sink discs, an axis of each of the hockey-puck diodes being aligned with the axes of the heat-sink discs, each of the hockey-puck diodes including first and second contacts on the axis at each of first and second sides thereof respectively, means for applying an inward axial force on axially outward ones of the heat-sink discs whereby a predetermined axial contact force is provided between each of the first and second contacts and their adjacent pair of the heat-sink discs, means for connecting the AC power to a first subset of the heat-sink discs, each of the heat-sink discs of the first subset including means for connecting the AC power to a selected one of the first and second contacts of a second subset of the hockey-puck diodes, means for connecting rectified DC power from a third subset of the heat-sink discs, the third subset including means for receiving the DC power from selected ones of the first and second contacts of a fourth subset of the hockey-puck diodes and means for applying the DC power to the rotor.

Briefly stated, the present invention provides a rectifier assembly which may be disposed in a cylindrical cavity on the axis of the shaft of a brushless exciter for a dynamoelectric machine. The rectifier assembly is made up of a stack of generally circular heat-sink discs with a cylindrical diode sandwiched on the axis between adjacent pairs of the heat-sink discs. A predetermined value of contact force is applied to the diodes through the stack of heat-sink discs using a plurality of tensioning bolts passing through the stack and tensioned using Belleville springs. All electrical connections to the diodes are made through the heat-sink discs using conductor bars which pass in aligned slots in the edges of the heat-sink discs, each making contact with only a desired single one of the heat-sink discs. A plurality of air flow openings in the heat-sink discs both permit the passage of air therethrough and also flow cooling air onto the body of the diodes. The flow of cooling air is enhanced by providing exit openings for the cooling air which are located at greater diameters than the diameter of the cylindrical cavity containing the rectifier assembly. This permits centrifugal force to add to the air flow.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 7 is an exploded view of a rectifier assembly according to an embodiment of the present invention.

FIG. 8 is a cross section of a portion of a dynamoelectric machine showing the flow path of cooling air through the rectifier assembly of the present invention.

DETAILED DESCRIPTION OF THE PREFERRED EMBODIMENT

The present invention is equally applicable to a dynamoelectric machine functioning as a motor or as a generator. For concreteness of description, however, the following disclosure is directed toward a dynamoelectric machine driven as an AC motor by power from AC mains.

Figure 1:
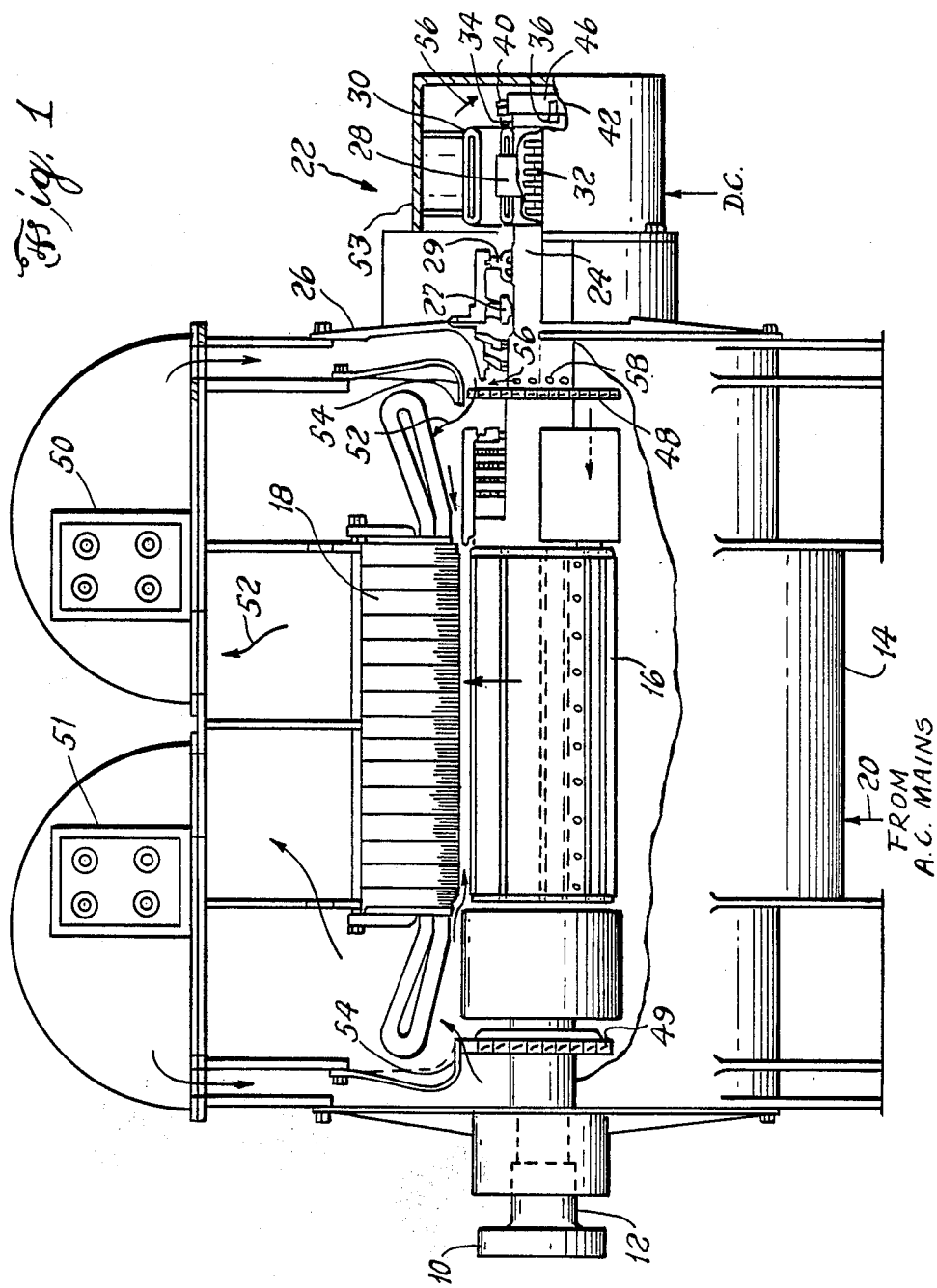
FIG. 1 is a schematic diagram, partly in cross section, of a dynamoelectric machine according to an embodiment of the invention.

Referring to FIG. 1, there is shown a bolted coupling 10 for coupling power to a load (not shown) from a shaft 12 receiving driving power from an AC motor 14. As is conventional, AC motor 14 includes a rotor 16 rotating shaft 12 within a stator 18. Rotor 16 is excited with DC excitation power in order to interact with the rotating magnetic field produced by AC power fed to stator 18 from AC mains 20.

An exciter 22 is disposed on an extension 24 of shaft 12 which, in the embodiment shown, is outboard of an end shield 26. End shield 26 may contain suitable conventional bearings 27 and oil deflectors 29. Exciter 22 includes a rotor 28 affixed for rotation with extension 24 within a stationary stator 30. As is conventional in brushless exciters, stator 30 receives DC energizing power from a source which may be, for example, a rectifier (not shown) which rectifies power from AC mains 20 and applies it to stator 30. Rotor 28 is conventionally wound as a three-phase generator rotor to produce a source of exciter power for rotor 16. Rotor 16, however, requires that its exciter power be DC. The three-phase AC power from rotor 28 is rectified in a rectifier assembly 32 which is axially disposed within extension 24. The three phases of the AC power from rotor 28 are fed through respective junction clips 34, 36 and 38 (of which junction clip 38 is hidden and not shown), spaced about 120 degrees apart, to mating contact portions of AC bus bars 40, 42 and 44 (of which AC bus bar 44 is hidden and not shown). AC bus bar 40, AC bus bar 42 and AC bus bar 44 apply the AC power to sections of rectifier assembly 32 within extension 24, as will be explained more fully hereinafter. An annular end cover 46 covers the outboard end of extension 24 and secures rectifier assembly 32 in position.

Main cooling fans 48 and 49 within AC motor 14 draw cooling air through heat exchangers 50 and 51. The cooling air passes over the elements within AC motor 14 as indicated by main cooling air flow arrows 52 and returns in a closed loop to heat exchangers 50 and 51. A shroud 54 may be included surrounding the tips of main cooling fans 48 and 49 to improve air flow. In addition to the air flow indicated by main cooling air flow arrows 52, cooling air for cooling rectifier assembly 32 is fed by a conduit (not shown) from heat exchanger 50 to an enclosure 53 surrounding exciter 22. Part of the cooling air fed into enclosure 53 is drawn through an axial opening (not shown) in end cover 46 as indicated by rectifier cooling air flow arrows 56. The remainder of the cooling air fed to enclosure 53 passes over the exterior portions of exciter 22 and is returned to the main cooling flow through a conduit (not shown). The rectifier cooling air 56 flows axially inward cooling the elements of rectifier assembly 32 and exits within AC motor 14 through a plurality of radially directed air flow channels 58 under the urging of both main cooling fan 48 and of centrifugal forces. The centrifugal forces arise due to the fact that the region of shaft 12 containing radially directed air flow channels 58 has a greater outside diameter than the bore within extension 24 containing rectifier assembly 32. The high rotational speeds for which the present invention is intended produce centrifugal forces which are effective to produce an air flow along the axis of extension 24 which exits through radially directed air flow channels 58. When the air flow produced by such centrifugal forces is aided by the action of main cooling fan 48, an effective flow of cooling air past rectifier assembly 32 is attained.

Figure 2:
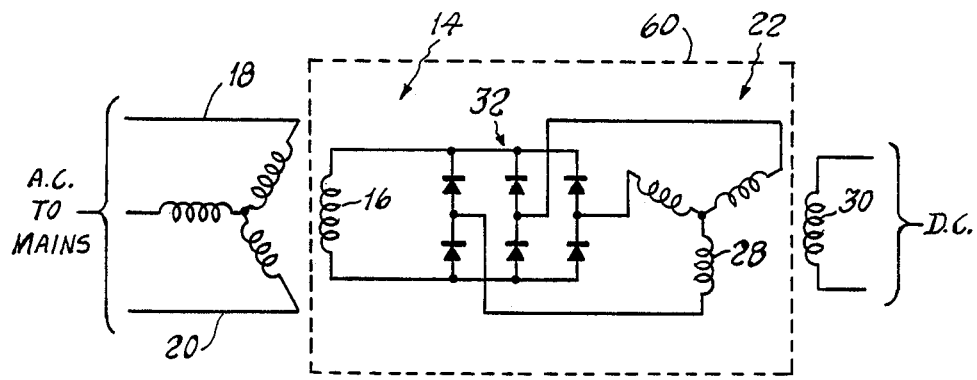
FIG. 2 is a simplified electrical schematic diagram of a brushless exciter according to an embodiment of the invention.

Referring now to FIG. 2, there is shown a simplified electrical schematic of a portion of the system of FIG. 1 in which rotating elements 60 are enclosed within a dashed box. It will be seen that each phase of the AC power from rotor 28 is full-wave rectified by rectifier assembly 32 and applied to rotor 16.

Figure 3:
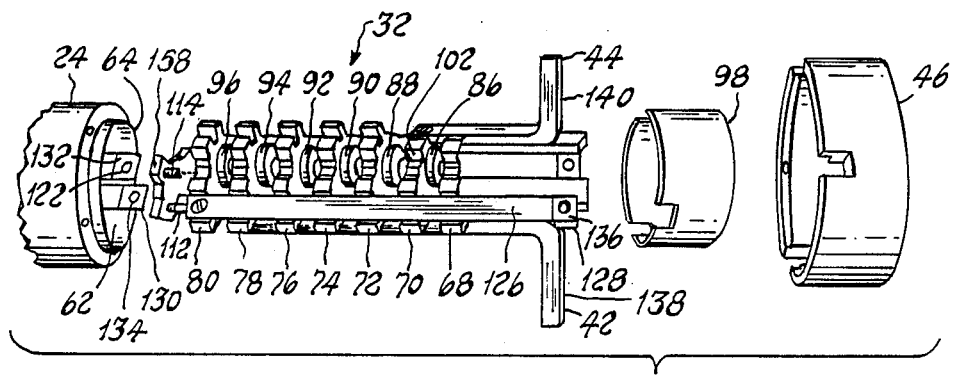
FIG. 3 is a closeup view of the rectifier assembly of FIG. 1 according to an embodiment of the invention.

Referring now to FIG. 3, rectifier assembly 32 is seen to be a unitary assembly which can be easily and quickly removed from, and installed in, a cylindrical cavity 62 in extension 24 with minimum down time of AC motor 14. An insulating sleeve 64 lines cylindrical cavity 62 to prevent accidental electrical contact between exposed portions of rectifier assembly 32 and the interior of cylindrical cavity 62. If a failure of, for example, a diode, occurs in rectifier assembly 32, rectifier assembly 32 can be slid out of insulating sleeve 64 and removed as a replaceable unit which may be replaced with a spare rectifier assembly 32 without requiring AC motor 14 to remain off line pending troubleshooting and replacement of an individual failed element. After a failed rectifier assembly 32 has been removed and replaced, appropriate troubleshooting may be performed to identify the failed diode in the removed rectifier assembly 32. The failed diode can then be replaced without impact on the continued operation of AC motor 14.

A set of seven lobed heat sink discs 68, 70, 72, 74, 76, 78 and 80 clamp between adjacent pairs thereof six hockey-puck diodes 86, 88, 90, 92, 94 and 96 to form a stack which is tensioned to accurately apply a stable predetermined axial force on the contacts of hockey-puck diodes 86, 88, 90, 92, 94 and 96 using a plurality of tension rods and Belleville washers, to be later described. An insulating inner cap 98 may be disposed within end cover 46 to also prevent undesired electrical contact between rectifier assembly 32 and end cover 46. All AC and DC electrical connections to and from rectifier assembly 32 are made through lobed heat sink discs 68, 70, 72, 74, 76, 78 and 80.

Figure 4:
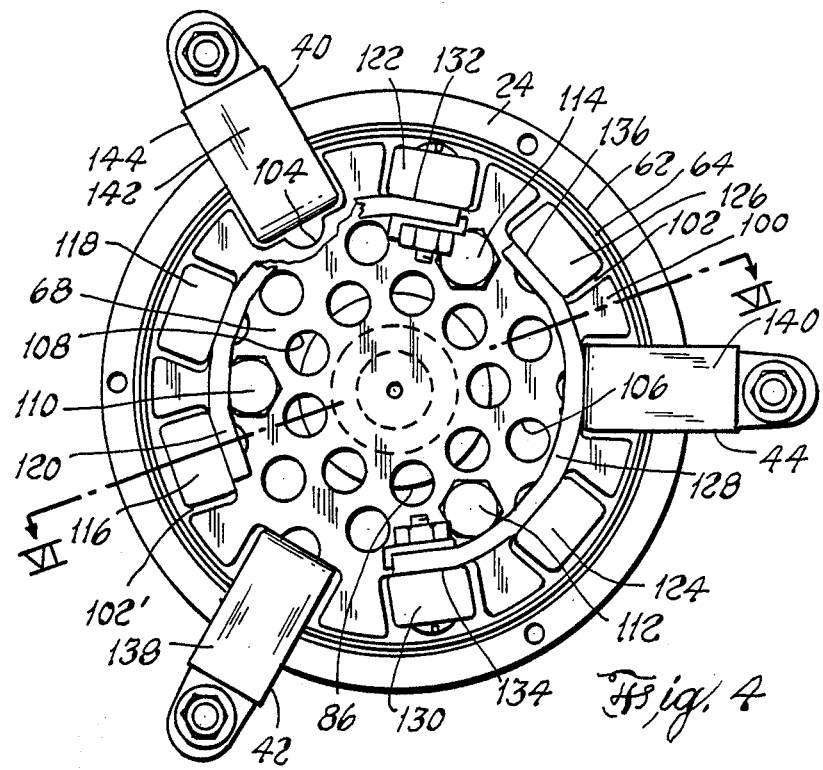
FIG. 4 is an end view of the rectifier assembly of FIG. 3.

Referring now also to FIG. 4, all of lobed heat sink discs 68, 70, 72, 74, 76, 78 and 80 are preferably identical. Lobed heat sink disc 68, which is visible in the end view of FIG. 4 and is taken to be representative, includes nine lobes 100 in its perimeter equally spaced about 40 degrees apart, each adjacent pair of lobes 100 defining a slot 102 between them. All but one of slots 102 include a half circular air flow opening 104 centered in their bases. One slot 102' omits the half circular air flow opening 104 present in the remaining eight slots 102. The slot 102' in each lobed heat sink disc is tangentially indexed during assembly of rectifier assembly 32 to serve as the electrical contact area for its respective lobed heat sink disc. The remaining eight slots 102 in each of lobed heat sink discs 68, 70, 72, 74, 76, 78 and 80 are unused or are employed as non-contacting guides or vias for the axial passage of electrical busses.

A plurality of air flow openings 106 are densely distributed over the surface area of lobed heat sink disc 68. An inner ring of air flow openings 108 is positioned as close as possible to hockey-puck diode 86 in order to flow as much cooling air as possible directly in contact with hockey-puck diode 86.

Three tensioning bolts 110, 112 and 114, the heads of which are shown, are spaced 120 degrees apart about the axis of rectifier assembly 32.

Figure 5:
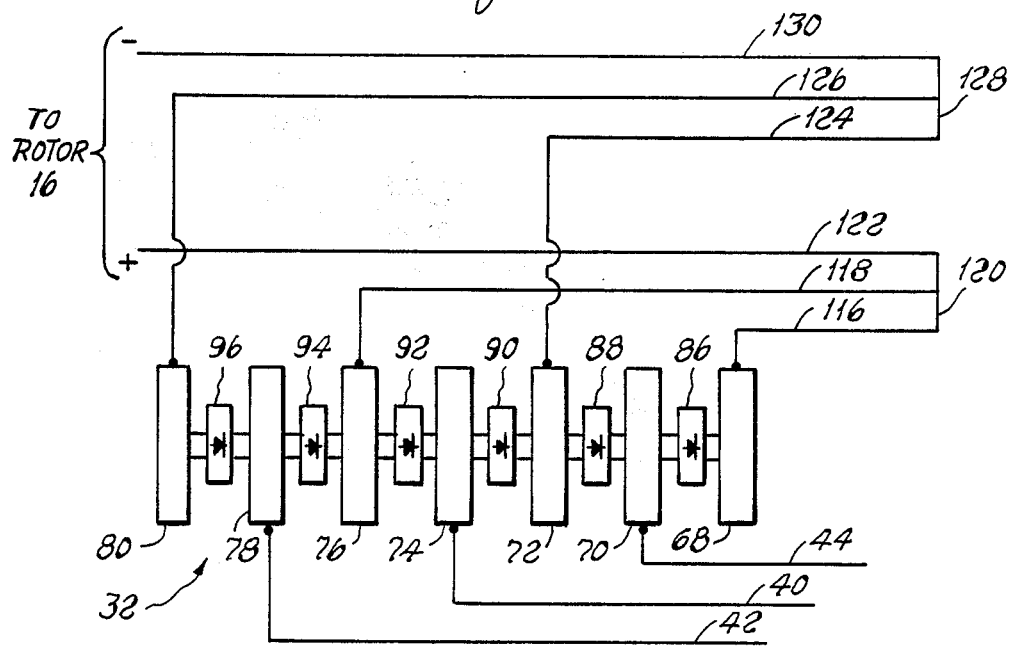
FIG. 5 is a simplified mechanical schematic diagram of the rectifier assembly according to an embodiment of the invention.

Before continuing with the detailed description of the structure of rectifier assembly 32, understanding of the physical relationships of the elements thereof will be improved by the following description with reference to the simplified physical schematic of rectifier assembly 32 shown in FIG. 5. AC bus bars 40, 42 and 44 are connected respectively to lobed heat sink discs 74, 78 and 70, that is, to the fourth, sixth and second lobed heat sink discs counting from the outside. First and second positive pickup bars 116 and 118 are connected respectively to lobed heat sink discs 68 and 76. A connecting ring 120 connects the outboard ends of positive pickup bar 116 and positive pickup bar 118 together and to one end of a positive bus bar 122. Similarly, first and second negative pickup bars 124 and 126 are connected respectively to lobed heat sink disc 72 and 80. A connecting ring 128 connects the outboard ends of negative pickup bar 124 and 126 together and to a negative bus bar 130. Bus bars 122 and 130 connect positive and negative excitation power respectively to rotor 16.

Referring again also to FIGS. 3 and 4, when rectifier assembly 32 is removed from cylindrical cavity 62, bus bars 122 and 130 remain in position in cylindrical cavity 62. Upon reinstallation, positive bus bars 122 and 130 fit within aligned slots 102 in lobed heat sink discs 68, 70, 72, 74, 76, 78 and 80 until, when rectifier assembly 32 is fully inserted into cylindrical cavity 62, contact areas 132 and 134 on outboard ends of bus bars 122 and 130 are aligned with connecting rings 120 and 128 respectively for bolted connection therebetween. As particularly shown in FIG. 3, negative pickup bar 126 extends within slots 102 from innermost lobed heat sink disc 80, with which it makes electrical contact, outward past outermost lobed heat sink disc 68 to position a contact area 136 adjacent to connecting ring 128 for connection thereto. AC bus bar 42 and AC bus bar 44 are similarly shown terminating at lobed heat sink discs 78 and 70 respectively, with which they make electrical contact, and extending in aligned slots 102 outward past lobed heat sink disc 68 to end in radially outward directed lugs 138 and 140. As shown in FIGS. 4 and 5, AC bus bar 40 is connected to lobed heat sink disc 74 and terminates in a radially outward directed lug 142.

Non-contact areas of positive pickup bars 116 and 118, negative pickup bars 124 and 126, positive bus bar 122, negative bus bar 130 and AC bus bars 40, 42 and 44 are covered with a hard, abrasion-resistant insulating covering 144 such as, for example, a coating of cured resin-impregnated glass fabric. Insulating covering 144 permits running these electrical conductors in slots 102 without concern for making accidental electrical contact with improper ones of the lobed heat sink discs.

Figure 6:
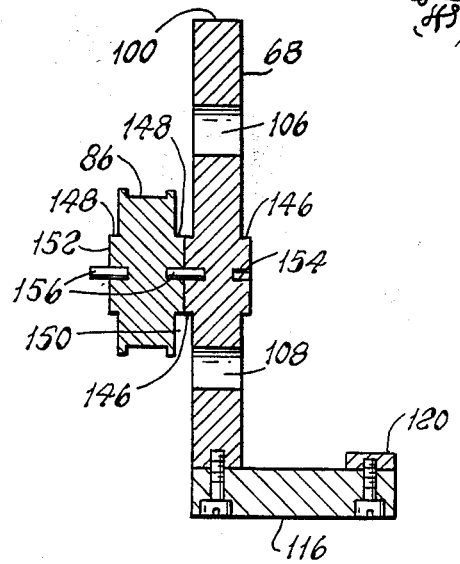
FIG. 6 is a partial cross section taken along VI—VI of FIG. 4.

Referring now to the cross section of lobed heat sink disc 68 shown in FIG. 6, each side of lobed heat sink disc 68, as well as all of the other lobed heat sink discs, includes a raised circular boss 146 centered therein. Raised circular boss 146 has a diameter substantially matching a diameter of a raised circular contact 148 on each side of hockey-puck diode 86. When assembled, the mating of raised circular boss 146 and raised circular contact 148 spaces the body of hockey-puck diode 86 away from the main surface of lobed heat sink disc 68 to form an annular air circulation region 150 which provides more intimate contact between the air flowing through air flow openings 106 and particularly through the air flow openings 106 of inner ring of air flow openings 108. Hockey-puck diodes 86 are conventionally supplied with a locating hole 152 centered in each raised circular contact 148. Lobed heat sink disc 68 also includes a locating hole 154 centered in each of its raised circular bosses 146. A small alignment pin 156, closely fitting locating hole 152 and locating hole 154 is inserted therein during assembly of rectifier assembly 32 to provide positive alignment and resistance to transverse displacement of all lobed heat sink discs and hockey-puck diodes. Although a raised circular boss 146 is provided on the outer surface of lobed heat sink disc 68, it is not used. However, manufacturing convenience favors making all of lobed heat sink discs 68, 70, 72, 74, 76 and 80 identical and, since the presence of an outer raised circular boss 146 does no harm, it is included on lobed heat sink disc 68.

Referring now to the exploded view of rectifier assembly 32 in FIG. 7, a spider 158 at an inner end of rectifier assembly 32 includes three arms 160 each having a hole 162 passing axially therethrough. Tensioning bolts 110, 112 and 114 each include an insulating coating 164 beyond which a threaded end portion 166 protrudes. Insulating coating 164 may be of any convenient type of hard, abrasion-resistant insulating coating such as, for example, a layer of cured, resin-impregnated glass fabric. An insulating washer 168 is provided to fit under the head of each of tensioning bolts 110, 112 and 114 to prevent electrical contact between the heads and lobed heat sink disc 68. The combination of insulating coating 164 and insulating washer 168 maintains tensioning bolts 110, 112 and 114 electrically insulated from lobed heat sink discs 68, 70, 72, 74, 76, 78 and 80 through which they pass.

Threaded end portions 166 pass through corresponding holes 162 in spider 158 each to receive a stack of Belleville washers 170. At least one tensioning nut 172 is engaged with each threaded end portion 166 outboard of the stack of Belleville washers 170 thereon. Conventional means may be employed to ensure that tensioning nuts 172 do not loosen during use. For example, a jam nut (not shown) may be employed for this purpose. Alternatively, an additional spider (not shown) may be provided between the stacks of Belleville washers 170 and the tensioning nuts 172 and a bent tab may engage one or more flats on each tensioning nut 172 for preventing motion during use.

An insulating cylinder 174 of a suitable hard insulating material is disposed between lobed heat sink disc 80 and spider 158. A depression or hole 176 is axially located on an inboard surface of spider 158. A similar depression or hole 176 (not shown) is axially located on an outboard end of insulating cylinder 174. A force-transmitting ball 178, engages the facing depressions or holes 176 and transmits all of the axial force produced by the stacks of Belleville washers 170 along the axis of insulating cylinder 174 to the outboard end of lobed heat sink disc 80. The use of force-transmitting ball 178 for developing an essentially single-point force transfer equalizes possible differences in the forces produced by the three stacks of Belleville washers 170.

The spring constant for each type of Belleville washers 170 is a well known engineering quantity. In order to produce the required contact force on hockey-puck diodes 86–96, it is only necessary to tighten tensioning nuts 172 on threaded end portions 166 while measuring the depression of the stacks of Belleville washers 170 until a value of depression of the stacks of Belleville washers 170 reaches a predetermined value. The contact force thus attained is substantially constant over the life of rectifier assembly 32.

Referring now to FIG. 8, the flow path of cooling air through rectifier assembly 32 is shown. Since end cover 46 and insulating inner cap 98 are both annular with openings on the axes, air can flow into cylindrical cavity 62 along the axis of extension 24 and through air flow openings 106 in the lobed heat sink discs making up rectifier assembly 32 as indicated by rectifier cooling air flow arrows 56. Bus bars 122 and 130 continue along the axis of shaft 12 to conduct the DC excitation to rotor 16 (not shown in FIG. 8). An air flow channel 180 joins cylindrical cavity 62 with the radially inner ends of radially directed air flow channels 58 thus permitting air which enters the outboard end of extension 24 to exit toward main cooling fan 48. Main cooling fan 48 produces a low-pressure region in the vicinity of the radially outer ends of radially directed air flow channels 58 thus encouraging the air flow. In addition, the radially outer ends of radially directed air flow channels 58 are disposed at substantially greater radii than the diameter of cylindrical cavity 62. Thus, in a rapidly rotating shaft 12 and extension 24 a substantial centrifugal force urges the flow of air outward through radially directed air flow channels 58 and aids in producing the cooling flow of air through rectifier assembly 32.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A rectifier assembly for use in a brushless exciter of a dynamoelectric machine, said dynamoelectric machine including a cylindrical cavity in a shaft thereof and an exciter on said shaft effective for generating AC power, comprising:

a plurality of conductive heat-sink discs having their axes aligned to form a stack;

a hockey-puck diode disposed in said stack between each adjacent pair of said heat-sink discs, an axis of each of said hockey-puck diodes being aligned with said axes of said heat-sink discs;

each of said hockey-puck diodes including first and second contacts on said axis at each of first and second sides thereof respectively;

means for applying an inward axial force on axially outward ones of said heat-sink discs whereby a predetermined axial contact force is provided between each of said first and second contacts and their adjacent pair of said heat-sink discs;

said stack being fittable within said cylindrical cavity;

means for connecting AC power to a first subset of said heat-sink discs; each of said heat-sink discs of said first subset including means for connecting said AC power to a selected one of said first and second contacts of a second subset of said hockey-puck diodes;

means for connecting rectified DC power from a third subset of said heat-sink discs, said third subset including means for receiving said DC power from selected other ones of said first and second contacts of the second subset of said hockey-puck diodes; and wherein all electrical connection to said hockey-puck diodes is effected through said heat sink discs; and, a plurality of slots about the perimeter of each of the heat sink discs, at least some of the slots on all of the heat-sink discs in said stack being aligned, and said means for connecting AC power to the first subset of said heat-sink discs and said means for connecting rectified DC power from the third subset of said heat-sink discs include conductive bars axially disposed in different ones of said slots and making electrical contact with only one of said heat-sink discs.

2. A rectifier assembly according to claim 1 wherein said means for applying an inward axial force includes a plurality of tensioning bolts passing axially through aligned holes in said heat-sink discs and resilient means on each of said tensioning bolts for producing said inward axial force.

3. A rectifier assembly according to claim 2 wherein said resilient means includes at least one Belleville washer on each of said tensioning bolts.

4. A rectifier assembly according to claim 2 wherein said means for applying an inward axial force further includes means for applying said inward axial force at substantially a single point on said axis.

5. A rectifier assembly according to claim 4 wherein said means for applying said inward axial force at substantially a single point includes a spider axially disposed outside an end one of said heat-sink discs, said plurality of tensioning rods passing through said spider and said resilient means being disposed at a side of said spider remote from said end one, a force-transmitting ball disposed on said axis between said spider and said end one, said inward axial force being transmitted from said spider to said stack through said force-transmitting ball.

6. A rectifier assembly according to claim 1 wherein said means for connecting AC power to a selected one of said first and second contacts and said means for receiving DC power from selected other ones of said first and second contacts includes first and second raised bosses axially disposed on opposed sides of each of said heat-sink discs, said raised bosses being effective to abut respective ones of said contacts.

7. A rectifier assembly according to claim 6 wherein said raised bosses include a diameter substantially smaller than a diameter of said hockey-puck diodes, said raised bosses being effective to space said hockey puck diodes away from radially outer portions of said heat-sink discs whereby cooling air is permitted to reach a surface of said hockey-puck diode.

8. A rectifier assembly according to claim 1 wherein said heat-sink discs each include a plurality of air flow openings therein for permitting axial flow of cooling air therethrough into contact with surfaces of said hockey-puck diodes.

9. A rectifier assembly according to claim 8 wherein said means for connecting AC power to a selected one of said first and second contacts and said means for receiving DC power from selected other ones of said first and second contacts includes first and second raised bosses axially disposed on opposed sides of each of said heat-sink discs, said raised bosses being effective to abut respective ones of said contacts, said raised bosses including a diameter substantially smaller than a diameter of said hockey-puck diodes, said raised bosses being effective to space said hockey puck diodes away from radially outer portions of said heat-sink discs whereby axial flow of cooling air is permitted to reach a surface of said hockey-puck diode.

10. A rectifier assembly according to claim 1 further comprising means for permitting removal and replacement of said stack as a unit.

* * * * *